(12) United States Patent
Shahparnia

(10) Patent No.: US 9,557,845 B2
(45) Date of Patent: Jan. 31, 2017

(54) INPUT DEVICE FOR AND METHOD OF COMMUNICATION WITH CAPACITIVE DEVICES THROUGH FREQUENCY VARIATION

(75) Inventor: Shahrooz Shahparnia, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,958

(22) Filed: Jul. 27, 2012

(65) Prior Publication Data

US 2014/0028576 A1   Jan. 30, 2014

(51) Int. Cl.
  *G06F 3/041*   (2006.01)
  *G06F 3/033*   (2013.01)
  *G06F 3/044*   (2006.01)
  *G06F 3/0354*  (2013.01)

(52) U.S. Cl.
  CPC ............ *G06F 3/0416* (2013.01); *G06F 3/033* (2013.01); *G06F 3/03545* (2013.01); *G06F 3/044* (2013.01)

(58) Field of Classification Search
  None
  See application file for complete search history.

(56) References Cited

U.S. PATENT DOCUMENTS

| | | |
|---|---|---|
| 3,462,692 A | 8/1969 | Bartlett |
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |

(Continued)

FOREIGN PATENT DOCUMENTS

| | | |
|---|---|---|
| CN | 1243282 A | 2/2000 |
| CN | 1278348 A | 12/2000 |

(Continued)

OTHER PUBLICATIONS

Haines, L. (Mar. 23, 2005). "Japanese Enable Human Area Network," *The Register* located at http:/www.theregister.co.uk/2005/03/23/human_area_network/print.html>, last visited Jun. 30, 2009, two pages.

(Continued)

*Primary Examiner* — Srilakshmi K Kumar
*Assistant Examiner* — Stephen T Reed
(74) *Attorney, Agent, or Firm* — Morrison & Foerster LLP

(57) ABSTRACT

A computing device configured to receive data from a peripheral device, such as a stylus. The computing device includes a processor, a touch interface, such as a touch screen, in communication with the processor and configured to detect an input corresponding to an object approaching or contacting a surface. The computing device further includes a touch filter in communication with the touch interface and a peripheral filter in communication with the touch interface. The touch filter is configured to reject a peripheral frequency corresponding to a peripheral signal of the peripheral device and the peripheral filter is configured to reject a touch frequency component corresponding to a touch signal corresponding to a touch input.

15 Claims, 9 Drawing Sheets

(56) References Cited

U.S. PATENT DOCUMENTS

| | | |
|---|---|---|
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday |
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Caswell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A * | 3/1997 | Gasparik .................. 340/870.01 |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |

(56) References Cited

U.S. PATENT DOCUMENTS

| | | |
|---|---|---|
| 6,049,428 A | 4/2000 | Khan et al. |
| 6,061,117 A | 5/2000 | Horie et al. |
| 6,064,374 A | 5/2000 | Fukuzaki |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,754,472 B1 | 6/2004 | Williams et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 * | 11/2007 | Morag et al. ................. 345/173 |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |

(56) References Cited

U.S. PATENT DOCUMENTS

| | | |
|---|---|---|
| 8,493,331 B2 | 7/2013 | Krah et al. |
| 8,536,471 B2 | 9/2013 | Stern et al. |
| 8,537,126 B2 | 9/2013 | Yousefpor et al. |
| 8,552,986 B2 | 10/2013 | Wong et al. |
| 8,581,870 B2 | 11/2013 | Bokma et al. |
| 8,605,045 B2 | 12/2013 | Mamba et al. |
| 8,659,556 B2 | 2/2014 | Wilson |
| 8,698,769 B2 * | 4/2014 | Coulson et al. ............ 345/173 |
| 8,723,825 B2 | 5/2014 | Wright et al. |
| 8,816,985 B1 | 8/2014 | Tate et al. |
| 8,847,899 B2 * | 9/2014 | Washburn et al. .......... 345/173 |
| 8,928,635 B2 | 1/2015 | Harley et al. |
| 8,933,899 B2 | 1/2015 | Shahparnia et al. |
| 9,013,429 B1 | 4/2015 | Krekhovetskyy et al. |
| 9,092,086 B2 | 7/2015 | Krah et al. |
| 9,146,414 B2 | 9/2015 | Chang et al. |
| 9,170,681 B2 | 10/2015 | Huang et al. |
| 9,310,923 B2 | 4/2016 | Krah et al. |
| 9,329,703 B2 | 5/2016 | Falkenburg et al. |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 * | 6/2002 | Griffis ..................... 382/107 |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer |
| 2003/0218116 A1 | 11/2003 | den Boer |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley et al. |
| 2006/0012580 A1 | 1/2006 | Perski et al. |
| 2006/0034492 A1 | 2/2006 | Siegel et al. |
| 2006/0120013 A1 | 6/2006 | Dioro et al. |
| 2006/0125971 A1 | 6/2006 | Abileah et al. |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0217064 A1 | 9/2006 | Glass et al. |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0146349 A1 | 6/2007 | Errico et al. |
| 2007/0216905 A1 | 9/2007 | Han et al. |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | den Boer et al. |
| 2008/0142280 A1 * | 6/2008 | Yamamoto et al. ....... 178/18.02 |
| 2008/0158165 A1 | 7/2008 | Geaghan et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0242346 A1 | 10/2008 | Rofougaran et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |

(56) References Cited

U.S. PATENT DOCUMENTS

| | | |
|---|---|---|
| 2009/0140986 A1 | 6/2009 | Karkkainen et al. |
| 2009/0153152 A1 | 6/2009 | Maharyta et al. |
| 2009/0153525 A1 | 6/2009 | Chang |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1* | 10/2009 | Rimon et al. ............... 345/173 |
| 2009/0262637 A1 | 10/2009 | Badaye et al. |
| 2009/0273579 A1 | 11/2009 | Zachut et al. |
| 2009/0322685 A1* | 12/2009 | Lee ............... 345/173 |
| 2009/0322696 A1 | 12/2009 | Yaakoby et al. |
| 2010/0001978 A1 | 1/2010 | Lynch et al. |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1* | 4/2010 | King-Smith et al. ......... 345/174 |
| 2010/0118237 A1 | 5/2010 | Katoh et al. |
| 2010/0155153 A1 | 6/2010 | Zachut |
| 2010/0160041 A1 | 6/2010 | Grant et al. |
| 2010/0194692 A1 | 8/2010 | Orr et al. |
| 2010/0252335 A1* | 10/2010 | Orsley ............... 178/18.03 |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0309171 A1 | 12/2010 | Hsieh et al. |
| 2010/0315384 A1* | 12/2010 | Hargreaves et al. ......... 345/179 |
| 2010/0315394 A1 | 12/2010 | Katoh et al. |
| 2010/0321320 A1 | 12/2010 | Hung et al. |
| 2010/0327882 A1 | 12/2010 | Shahparnia et al. |
| 2010/0328249 A1 | 12/2010 | Ningrat et al. |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1* | 3/2011 | Wilson et al. ............... 370/254 |
| 2011/0084857 A1* | 4/2011 | Marino et al. ............... 341/5 |
| 2011/0084937 A1* | 4/2011 | Chang et al. ............... 345/174 |
| 2011/0090146 A1 | 4/2011 | Katsurahira |
| 2011/0090181 A1 | 4/2011 | Maridakis |
| 2011/0118030 A1 | 5/2011 | Walley et al. |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0216016 A1 | 9/2011 | Rosener |
| 2011/0216032 A1* | 9/2011 | Oda et al. ............... 345/174 |
| 2011/0254807 A1 | 10/2011 | Perski et al. |
| 2011/0273398 A1 | 11/2011 | Ho et al. |
| 2011/0304583 A1 | 12/2011 | Kruglick |
| 2011/0304592 A1 | 12/2011 | Booth, Jr. et al. |
| 2012/0013555 A1* | 1/2012 | Maeda et al. ............... 345/173 |
| 2012/0019488 A1 | 1/2012 | McCarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1* | 5/2012 | Kremin et al. ............... 345/174 |
| 2012/0139865 A1 | 6/2012 | Krah |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1* | 7/2012 | Han ............... 345/174 |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon |
| 2012/0327041 A1 | 12/2012 | Harley |
| 2012/0331546 A1 | 12/2012 | Falkenburg |
| 2013/0027361 A1 | 1/2013 | Perski et al. |
| 2013/0069905 A1 | 3/2013 | Krah et al. |
| 2013/0088465 A1 | 4/2013 | Geller et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028577 A1 | 1/2014 | Krah |
| 2014/0028607 A1 | 1/2014 | Tan |
| 2014/0077827 A1 | 3/2014 | Seguine |
| 2014/0132556 A1 | 5/2014 | Huang et al. |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0267075 A1 | 9/2014 | Shahparnia et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |
| 2015/0338950 A1 | 11/2015 | Ningrat et al. |
| 2016/0162011 A1 | 6/2016 | Verma |
| 2016/0162101 A1 | 6/2016 | Pant et al. |
| 2016/0162102 A1 | 6/2016 | Shahparnia et al. |
| 2016/0179281 A1 | 6/2016 | Krah et al. |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| CN | 201837984 U | 5/2011 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 1 884 863 A1 | 2/2008 |
| EP | 2 040 149 A2 | 3/2009 |
| EP | 2 172 834 A2 | 4/2010 |
| EP | 2 221 659 A1 | 8/2010 |
| EP | 2 660 689 A1 | 11/2013 |

(56) References Cited

FOREIGN PATENT DOCUMENTS

| | | | |
|---|---|---|---|
| JP | 55-074635 A | 6/1980 | |
| JP | 57-203129 A | 12/1982 | |
| JP | 60-179823 A | 9/1985 | |
| JP | 64-006927 U | 1/1989 | |
| JP | 64-040004 U | 2/1989 | |
| JP | 1-196620 A | 8/1989 | |
| JP | 2-182581 A | 7/1990 | |
| JP | 2-211421 A | 8/1990 | |
| JP | 5-019233 A | 1/1993 | |
| JP | 5-173707 A | 7/1993 | |
| JP | 05-243547 A | 9/1993 | |
| JP | 8-166849 A | 6/1996 | |
| JP | 9-001279 A | 1/1997 | |
| JP | 9-185457 A | 7/1997 | |
| JP | 9-231002 A | 9/1997 | |
| JP | 9-274537 A | 10/1997 | |
| JP | 10-027068 A | 1/1998 | |
| JP | 10-040004 A | 2/1998 | |
| JP | 10-133817 A | 5/1998 | |
| JP | 10-133819 A | 5/1998 | |
| JP | 10-186136 A | 7/1998 | |
| JP | 10-198515 A | 7/1998 | |
| JP | 11-110110 A | 4/1999 | |
| JP | 11-242562 A | 9/1999 | |
| JP | 2000-020241 A | 1/2000 | |
| JP | 2000-163031 A | 6/2000 | |
| JP | 2002-342033 A | 11/2002 | |
| JP | 2005-129948 A | 5/2005 | |
| JP | 2005-352490 A | 12/2005 | |
| JP | 2009-054141 A | 3/2009 | |
| KR | 10-2013-0109207 A | 10/2013 | |
| TW | 200743986 A | 12/2007 | |
| TW | 200925944 A | 6/2009 | |
| TW | 201115414 A | 5/2011 | |
| TW | 201118682 A1 | 6/2011 | |
| TW | 201324242 A | 6/2013 | |
| TW | 201419103 A | 5/2014 | |
| TW | 201504874 A | 2/2015 | |
| WO | WO-97/40488 A1 | 10/1997 | |
| WO | WO-99/21160 A1 | 4/1999 | |
| WO | WO-99/22338 A1 | 5/1999 | |
| WO | WO-01/45283 A1 | 6/2001 | |
| WO | WO-2006/104214 A1 | 10/2006 | |
| WO | WO-2007/145346 A1 | 12/2007 | |
| WO | WO-2007/145347 A1 | 12/2007 | |
| WO | WO-2008/018201 A1 | 2/2008 | |
| WO | WO-2008/044368 A1 | 4/2008 | |
| WO | WO-2008/044369 A1 | 4/2008 | |
| WO | WO-2008/044370 A1 | 4/2008 | |
| WO | WO-2008/044371 A1 | 4/2008 | |
| WO | WO-2008/047677 A1 | 4/2008 | |
| WO | WO-2009/081810 A1 | 7/2009 | |
| WO | WO-2009/105115 A2 | 8/2009 | |
| WO | WO-2011/008533 A2 | 1/2011 | |
| WO | WO-2012/177567 A1 | 12/2012 | |
| WO | WO-2012/177571 A1 | 12/2012 | |
| WO | WO-2012/177573 A2 | 12/2012 | |
| WO | WO-2012/177569 A2 | 3/2013 | |
| WO | WO-2012/177569 A3 | 3/2013 | |
| WO | WO-2014/018233 A1 | 1/2014 | |
| WO | WO-2014/143430 A1 | 9/2014 | |
| WO | WO-2015/017196 A1 | 2/2015 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Feb. 7, 2013, for U.S. Appl. No. 12/960,068, filed Dec. 3, 2010, 24 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Abileah, A. et al. (2004). "59.3: Integrated Optical Touch Panel in a 14.1' AMLCD," *SID '04 Digest* (Seattle) pp. 1544-1547.
Abileah, A. et al. (2006). "9.3: Optical Sensors Embedded within AMLCD Panel: Design and Applications," *ADEAC '06, SID* (Atlanta) pp. 102-105.
Abileah, A. et al. (2007). "Optical Sensors Embedded within AMLCD Panel: Design and Applications," *Siggraph-07*, San Diego, 5 pages.
Anonymous. (2002). "Biometric Smart Pen Project," located at http://www.biometricsmartpen.de/ . . . , last visited Apr. 19, 2011, one page.
Bobrov, Y. et al. (2002). "5.2 Manufacturing of a Thin-Film LCD," *Optiva, Inc.*, San Francisco, CA. 4 pages.
Brown, C. et al. (2007). "7.2: A 2.6 inch VGA LCD with Optical Input Function using a 1-Transistor Active-Pixel Sensor," *ISSCC 2007* pp. 132-133, 592.
Den Boer, W. et al. (2003). "56.3: Active Matrix LCD with Integrated Optical Touch Screen," *SID'03 Digest* (Baltimore) pp. 1-4.
Echtler, F. et al. (Jan. 2010). "An LED-based Multitouch Sensor for LCD Screens," Cambridge, MA *ACM* 4 pages.
Final Office Action mailed Mar. 4, 2004, for U.S. Appl. No. 10/217,798, filed Aug. 12, 2002, 17 pages
Final Office Action mailed Jan. 21, 2005, for U.S. Appl. No. 10/329,217, filed Dec. 23, 2002, 13 pages.
Final Office Action mailed Aug. 9, 2005, for U.S. Appl. No. 10/442,433, filed May 20, 2003, six pages.
Final Office Action mailed Aug. 23, 2005, for U.S. Appl. No. 10/217,798, filed Aug. 12, 2002, 10 pages
Final Office Action mailed Dec. 13, 2005, for U.S. Appl. No. 10/371,413, filed Feb. 20, 2003, six pages.
Final Office Action mailed May 23, 2007, for U.S. Appl. No. 11/137,753, filed May 25, 2005, 11 pages.
Final Office Action mailed Oct. 18, 2007, for U.S. Appl. No. 11/351,098, filed Feb. 8, 2006, six pages.
Final Office Action mailed Oct. 31, 2007, for U.S. Appl. No. 10/217,798, filed Aug. 12, 2002, nine pages.
Final Office Action mailed Mar. 24, 2009, for U.S. Appl. No.. 11/351,098, filed Feb. 8, 2006, 10 pages.
Final Office Action mailed Feb. 10, 2011, for U.S. Appl. No. 11/901,649, filed Sep. 18, 2007, 20 pages.
Final Office Action mailed May 18, 2011, for U.S. Appl. No. 11/978,031, filed Oct. 25, 2007, 17 pages.
Final Office Action mailed Jun. 15, 2011, for U.S. Appl. No. 11/595,071, filed Nov. 8, 2006, 9 pages.
Final Office Action mailed Jun. 24, 2011, for U.S. Appl. No. 11/978,006, filed Oct. 25, 2007, 12 pages.
Final Office Action mailed Jul. 5, 2011, for U.S. Appl. No. 11/977,279, filed Oct. 24, 2007, 12 pages.
Final Office Action mailed Sep. 29, 2011, for U.S. Appl. No. 11/977,911, filed Oct. 26, 2007, 22 pages.
Final Office Action mailed Oct. 11, 2012, for U.S. Appl. No. 12/566,455, filed Sep. 24, 2009, 8 pages.
Final Office Action mailed Oct. 25, 2012, for U.S. Appl. No. 12/568,302, filed Sep. 28, 2009, 13 pages.
Final Office Action mailed Oct. 25, 2012, for U.S. Appl. No. 12/568,316, filed Sep. 28, 2009, 15 pages.
Final Office Action mailed Jul. 26, 2013, for U.S. Appl. No. 13/166,726, filed Jun. 22, 2011, ten pages.
Final Office Action mailed Oct. 31, 2013, for U.S. Appl. No. 13/166,699, filed Jun. 22, 2011, 13 pages.
Hong, S.J. et al. (2005). "Smart LCD Using a-Si Photo Sensor," *IMID'05 Digest* pp. 280-283.
International Preliminary Report on Patentability and Written Opinion mailed Oct. 8, 2004, for PCT Application No. PCT/US03/05300, filed Feb. 20, 2003, 15 pages.

(56) References Cited

OTHER PUBLICATIONS

International Preliminary Report on Patentability and Written Opinion mailed Dec. 30, 2004, for PCT Application No. PCT/US02/25573, filed Aug. 12, 2002, 16 pages.
International Preliminary Report on Patentability and Written Opinion mailed May 14, 2008, for PCT Application No. PCT/US06/43741, filed Nov. 10, 2006, four pages.
International Search Report mailed Apr. 14, 2003, for PCT Application No. PCT/US02/25573, filed Aug. 12, 2002 two pages.
International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
International Search Report mailed Jan. 16, 2013, for PCT Application No. PCT/US2012/043021, filed Jun. 18, 2012, six pages.
International Search Report mailed Sep. 12, 2013, for PCT Application No. PCT/US2013/048977, filed Jul. 1, 2013, six pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Non-Final Office Action mailed Jun. 4, 2003, for U.S. Appl. No. 10/217,798, filed Aug. 12, 2002, 16 pages.
Non-Final Office Action mailed May 21, 2004, for U.S. Appl. No. 10/329,217, filed Dec. 23, 2002, 13 pages.
Non-Final Office Action mailed Sep. 21, 2004, for U.S. Appl. No. 10/442,433, filed May 20, 2003, six pages.
Non-Final Office Action mailed Nov. 26, 2004, for U.S. Appl. No. 10/307,106, filed Nov. 27, 2002, eight pages.
Non-Final Office Action mailed Dec. 10, 2004, for U.S. Appl. No. 10/217,798, filed Aug. 12, 2002, nine pages.
Non-Final Office Action mailed Jan. 21, 2005, for U.S. Appl. No. 10/347,149, filed Jan. 17, 2003, nine pages.
Non-Final Office Action mailed Apr. 15, 2005, for U.S. Appl. No. 10/371,413, fled Feb. 20, 2003, four pages.
Non-Final Office Action mailed Jun. 22, 2005, for U.S. Appl. No. 10/739,455, filed Dec. 17, 2003, 10 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, seven pages.
Non-Final Office Action mailed Aug. 28, 2006, for U.S. Appl. No. 10/371,413, filed Feb. 20, 2003, six pages.
Non-Final Office Action mailed Jun. 28, 2007, for U.S. Appl. No. 11/351,098, filed Feb. 8, 2006, 12 pages.
Non-Final Office Action mailed Jun. 29, 2007, for U.S. Appl. No. 10/217,798, filed Aug. 12, 2002, 10 pages.
Non-Final Office Action mailed Feb. 25, 2008, for U.S. Appl. No. 11/137,753, filed May 25, 2005, 15 pages.
Non-Final Office Action mailed Jun. 24, 2008, for U.S. Appl. No. 11/351,098, filed Feb. 8, 2006, 11 pages.
Non-Final Office Action mailed Jun. 25, 2009, for U.S. Appl. No. 11/980,029, filed Oct. 29, 2007, 9 pages.
Non-Final Office Action mailed Nov. 23, 2009, for U.S. Appl. No. 11/407,545, filed Apr. 19, 2006, five pages.
Non-Final Office Action mailed Jul. 29, 2010, for U.S. Appl. No. 11/901,649, filed Sep. 18, 2007, 20 pages.
Non-Final Office Action mailed Oct. 13, 2010, for U.S. Appl. No. 11/978,006, filed Oct. 25, 2007, eight pages
Non-Final Office Action mailed Oct. 14, 2010, for U.S. Appl. No. 11/595,071, filed Nov. 8, 2006, seven pages.
Non-Final Office Action mailed Nov. 26, 2010, for U.S. Appl. No. 11/977,279, filed Oct. 24, 2007, nine pages.
Non-Final Office Action mailed Nov. 26, 2010, for U.S. Appl. No. 11/977,830, filed Oct. 26, 2007, seven pages.
Non-Final Office Action mailed Dec. 13, 2010, for U.S. Appl. No. 11/977,339, filed Oct. 24, 2007, eight pages.
Non-Final Office Action mailed Feb. 1, 2011, for U.S. Appl. No. 11/978,031, filed Oct. 25, 2007, 18 pages.
Non-Final Office Action mailed Apr. 29, 2011, for U.S. Appl. No. 11/977,911, filed Oct. 26, 2007, 19 pages.
Non-Final Office Action mailed Jun. 21, 2011, for U.S. Appl. No. 11/977,339, filed Oct. 24, 2007, 10 pages.
Non-Final Office Action mailed Jun. 28, 2011, for U.S. Appl. No. 12/852,883, filed Aug. 8, 2010, 16 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
Non-Final Office Action mailed Nov. 17, 2011, for U.S. Appl. No. 11/977,339, filed Oct. 24, 2007, nine pages.
Non-Final Office Action mailed Jan. 10, 2012, for U.S. Appl. No. 11/977,864, filed Oct. 26, 2007, six pages.
Non-Final Office Action mailed Jan. 31, 2012, for U.S. Appl. No. 12/566,477, filed Sep. 24, 2009, 11 pages.
Non-Final Office Action mailed Feb. 29, 2012, for U.S. Appl. No. 11/978,031, filed Oct. 25, 2007, 20 pages.
Non-Final Office Action mailed Apr. 20, 2012, for U.S. Appl. No. 12/566,455, filed Sep. 24, 2009, eight pages.
Non-Final Office Action mailed Jun. 5, 2012, for U.S. Appl. No. 11/595,071, filed Nov. 8, 2006, 14 pages.
Non-Final Office Action mailed Jun. 19, 2012, for U.S. Appl. No. 11/977,864, filed Oct. 26, 2007, seven pages.
Non-Final Office Action mailed Nov. 15, 2012, for U.S. Appl. No. 12/566,477, filed Sep. 24, 2009, 11 pages.
Non-Final Office Action mailed Mar. 5, 2013, for U.S. Appl. No. 13/166,726, filed Jun. 22, 2011, 14 pages.
Non-Final Office Action mailed Mar. 29, 2013, for U.S. Appl. No. 13/166,699, filed Jun. 22, 2011, 12 pages.
Non-Final Office Action mailed Jun. 17, 2013, for U.S. Appl. No. 13/166,711, filed Jun. 22, 2011, 8 pages.
Notification of Reasons for Rejection mailed Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708, filed Nov. 14, 2005, by den Boer et al.
U.S. Appl. No. 60/821,325, filed Aug. 3, 2006, by Abileah et al.
Yamaguchi, M. et al. (Jan. 1993). "Two-Dimensional Contact-Type Image Sensor Using Amorphous Silicon Photo-Transistor," *Jpn. J. Appl Phys.* 32(Part 1, No. 1B):458-461.
Final Office Action mailed Jan. 13, 2014, for U.S. Appl. No. 12/568,316, filed Sep. 28, 2009, 15 pages.
Non-Final Office Action mailed Sep. 18, 2013, for U.S. Appl. No. 13/652,007, filed Oct. 15, 2012, 16 pages.
Non-Final Office Action mailed Dec. 16, 2013, for U.S. Appl. No. 13/166,711, filed Jun. 22, 2011, 12 pages.
Non-Final Office Action mailed Feb. 27, 2014, for U.S. Appl. No. 11/977,279, filed Oct. 24, 2007, 11 pages.
Non-Final Office Action mailed Mar. 14, 2014, for U.S. Appl. No. 11/977,339, filed Oct. 24, 2007, 10 pages.
Notice of Allowance mailed Feb. 3, 2014, for U.S. Appl. No. 13/166,726, filed Jun. 22, 2011, nine pages.
Final Office Action mailed Apr. 28, 2014, for U.S. Appl. No. 13/652,007, filed Oct. 15, 2012, 16 pages.
Final Office Action mailed Jul. 14, 2014, for U.S. Appl. No. 13/166,711, filed Jun. 22, 2011, 12 pages.

(56) References Cited

OTHER PUBLICATIONS

International Search Report mailed Apr. 23, 2014, for PCT Application No. PCT/US2014/013927, filed Jan. 30, 2014, four pages.
Non-Final Office Action mailed May 8, 2014, for U.S. Appl. No. 13/560,973, filed Jul. 27, 2012, six pages.
Non-Final Office Action mailed Jun. 4, 2014, for U.S. Appl. No. 13/560,963, filed Jul. 27, 2012, nine pages.
Non-Final Office Action mailed Jun. 27, 2014, for U.S. Appl. No. 13/166,699, filed Jun. 22, 2011, 13 pages.
Notice of Allowance mailed May 12, 2014, for U.S. Appl. No. 13/166,726, filed Jun. 22, 2011, nine pages.
Notice of Allowance mailed Sep. 4, 2014, for U.S. Appl. No. 13/166,726, filed Jun. 22, 2011, nine pages.
Search Report dated Jun. 12, 2014, for ROC (Taiwan) Patent Application No. 101122110, one page.
TW Search Report dated Jul. 7, 2014, for TW Patent Application No. 101122109, filed Jun. 20, 2012, one page.
TW Search Report dated Jul. 8, 2014, for TW Patent Application No. 101122107, filed Jun. 20, 2012, one page.
International Search Report mailed Oct. 30, 2014, for PCT Application No. PCT/US2014/047658, filed Jul. 22, 2014, four pages.
Final Office Action mailed Dec. 2, 2014, for U.S. Appl. No. 13/560,963, filed Jul. 27, 2012, ten pages.
Final Office Action mailed Jan. 12, 2015, for U.S. Appl. No. 13/560,973, filed Jul. 27, 2012, six pages.
Final Office Action mailed May 4, 2015, for U.S. Appl. No. 13/166,699, filed Jun. 22, 2011, 17 pages.
Non-Final Office Action mailed Jan. 30, 2015, for U.S. Appl. No. 13/166,711, filed Jun. 22, 2011, 12 pages.
Non-Final Office Action mailed May 14, 2015, for U.S. Appl. No. 13/560,963, filed Jul. 27, 2012, twelve pages.
Non-Final Office Action mailed May 22, 2015, for U.S. Appl. No. 13/831,318, filed Mar. 14, 2013, eight pages.
Chinese Search Report dated Sep. 6, 2015, for CN Application No. CN 201280030349.9, with English translation, six pages.
Chinese Search Report dated Oct. 23, 2015, for CN Application No. CN 201280030351.6, with English translation, four pages.
Non-Final Office Action mailed Sep. 24, 2015, for U.S. Appl. No. 13/166,699, filed Jun. 22, 2011, 14 pages.
Non-Final Office Action mailed Dec. 4, 2015, for U.S. Appl. No. 14/333,461, filed Jul. 16, 2014, 15 pages.
Notice of Allowance mailed Dec. 15, 2015, for U.S. Appl. No. 13/560,973, filed Jul. 27, 2012, nine pages.
TW Search Report dated Nov. 20, 2015, for TW Patent Application No. 103126285, one page.
Final Office Action mailed Feb. 1, 2016, for U.S. Appl. No. 13/560,963, filed Jul. 27, 2012, 12 pages.
Final Office Action mailed Feb. 3, 2016, for U.S. Appl. No. 13/166,699, filed Jun. 22, 2011, 15 pages.
Non-Final Office Action mailed Feb. 11, 2016, for U.S. Appl. No. 14/578,051, filed Dec. 19, 2014, nine pages.
Notice of Allowance mailed Jan. 14, 2016, for U.S. Appl. No. 13/166,711, filed Jun. 22, 2011, five pages.
Final Office Action mailed Mar. 9, 2016, for U.S. Appl. No. 13/831,318, filed Mar. 14, 2013, nine pages.
Final Office Action mailed Aug. 20, 2015, for U.S. Appl. No. 13/166,711, filed Jun. 22, 2011, six pages.
Non-Final Office Action mailed May 13, 2016, for U.S. Appl. No. 15/057,035, filed Feb. 29, 2016, six pages.
Non-Final Office Action mailed May 17, 2016, for U.S. Appl. No. 14/333,382, filed Jul. 16, 2014, sixteen pages.
European Search Report dated May 2, 2016, for EP Application No. 15196245.3, filed Nov. 25, 2015, twelve pages.
Final Office Action mailed Jun. 3, 2016, for U.S. Appl. No. 14/333,461, filed Jul. 16, 2014, eight pages.
Non-Final Office Action mailed Jul. 1, 2016, for U.S. Appl. No. 14/333,457, filed Jul. 16, 2014, 27 pages.
Non-Final Office Action mailed Jul. 28, 2016, for U.S. Appl. No. 13/560,963, filed Jul. 27, 2012, twelve pages.
Notice of Allowance mailed Aug. 10, 2016, for U.S. Appl. No. 14/578,051, filed Dec. 19, 2014, seven pages.
TW Search Report dated Jun. 23, 2016, for TW Patent Application No. 104135140, with English Translation, two pages.

* cited by examiner

INPUT DEVICE FOR AND METHOD OF COMMUNICATION WITH CAPACITIVE DEVICES THROUGH FREQUENCY VARIATION

TECHNICAL FIELD

The present invention relates generally to computing devices, and more specifically, to input devices for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens receive a touch event and a position of the touch event on the touch sensor panel, and the computing system can then interpret the touch event in accordance with the display appearing at the time of the touch event, and thereafter can perform one or more actions based on the touch event.

Some capacitive sense touch sensor panels can be formed from a matrix of row and column traces, with capacitive sensing elements or nodes present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest.

In some instances it may be desirable for input devices, such as styli, to be able to transfer data, in addition to the touch location data, to the touch screen. For example, a stylus may have a finer tip than a user's finger and may be better able to transmit fine characters or symbols (such as those used in handwriting) better than a user's fingers. As another example, data from sensors in the input device may enhance the user experience, with the touch screen, e.g., a sensor may transfer force input parameters to the touch screen to vary an output corresponding to the input device. However, in many instances, the touch screen may have difficulty detecting the input device and/or may not recognize the signal from the input device, and data communication between the touch screen and the input device may be difficult to implement.

SUMMARY

One example of the present disclosure may take the form of a computing device configured to receive data from a peripheral device, such as a stylus. The computing device includes a processor, a touch interface, such as a touch screen, in communication with the processor and configured to detect an input corresponding to an object approaching or contacting a surface. The computing device further includes a touch filter in communication with the touch interface and a peripheral filter in communication with the touch interface. The touch filter is configured to reject a peripheral frequency corresponding to a peripheral signal of the peripheral device and the peripheral filter is configured to reject a touch frequency component corresponding to a touch signal corresponding to a touch input.

Another example of the disclosure may take the form of a method for receiving digital data through a touch screen. The method may include scanning a plurality of sense lines, filtering a first signal received through one or more of the plurality of sense lines by a touch filter, filtering the first signal by a peripheral filter, and analyzing a touch output from the touch filter and a peripheral output from the peripheral filter to determine whether the first signal is a touch signal or an input device signal.

SPECIFICATION

Overview

Figure 1:
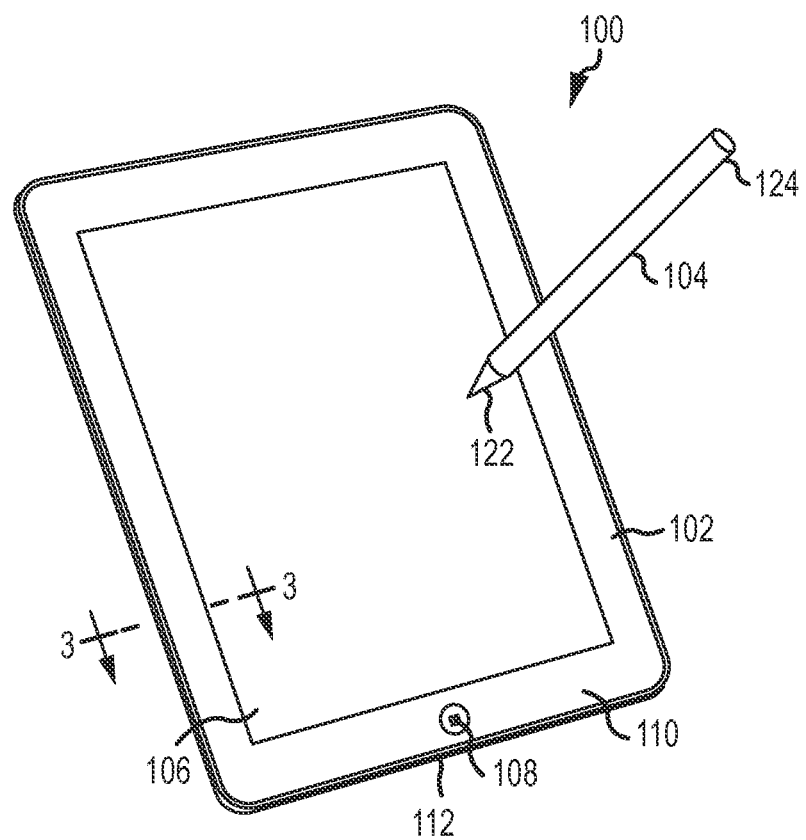
FIG. 1 is a perspective view of a system including a computing device and an input device configured to provide input data to the computing device.

In some embodiments herein, an input device and methods for transmitting data from the input device through a capacitive coupling or touch screen interface are disclosed. In one embodiment, the input device, which may be a peripheral device, such a stylus, may transmit data to the touch screen. The input device may transmit data to the touch screen without requiring the input device to send an activation signal or otherwise "sniff" the touch screen to indicate to the touch screen that data is about to be transferred thereto. Rather, the input device may be the "master" and the touch screen may be the "slave," which may allow the input device to transmit data as desired by the input device, which may result in more efficient data transmission between the two devices, and may eliminate the need for the touch screen to provide feedback to the input device.

In some embodiments, the touch screen may include one or more peripheral signal filters as well as one or more touch filters in communication with one or more sense lines for the touch screen. The peripheral filter may be one or more band pass filters with the pass band frequency set at a frequency corresponding to a frequency of an input signal (peripheral signal) from the input device. Additionally, the pass band of the peripheral filter is set at a frequency to reject touch signals (for example, from a user's finger) and environmental noise signals. Conversely, the touch filter may have a pass band that is narrow enough to reject the peripheral signal from the input device, as well as any environmental noise signals, but may have a bandwidth sufficiently wide to allow touch signals to be transmitted therethrough.

In these embodiments, when the touch screen receives an input, either from the input device or from a user's finger (or other user touch), the signal may be filtered by the peripheral signal and the touch filter. A processor in communication with the sense lines and the filters may analyze the output from each filter to determine if an input is a touch input or a peripheral input. In other words, if the signal passes through the touch filter the processor may determine that the received input was a touch signal, whereas if the signal passes through the peripheral filter, the processor may determined that the received input was a peripheral input. Because both user touches and touches by the input device may be filtered by the touch filter and the peripheral filter, the touch screen may simultaneously detect user touch inputs as well as any input signals from the input device.

Once the processor identifies a particular input signal as being an input from the input device, the touch screen may scan one or more drive lines. For example, the touch screen may multiplex one or more drive lines of the touch screen to receive additional data from the input device. In some instances, by scanning the drive lines the processor may be able to determine the horizontal location of the input device, and using the data from the sense lines may be able to determine the vertical location of the input device. Thus, by scanning the sense and drive lines, the x and y coordinates of the input device on the touch screen may be determined. Further, scanning the drive lines may allow the touch screen to receive additional data from the input signal of the input device.

The touch screen may be configured to receive an analog and/or digital signal from the input device. This may allow the input device to transfer data from one or more sensors (such as force sensors, accelerometers, gyroscopes, and so on) to the touch screen. Additionally, the touch screen may vary a displayed output, may provide different inputs to one or more applications, or the like based on the data received from the input device. As one example, the input device may include a force sensor that may sense a change in force experienced on a body of the input device, and this data may be transferred to the touch screen which may vary the thickness of a displayed line corresponding to the movements of the input device.

DETAILED DESCRIPTION

Turning now to the figures, a communication system including a computing device and an input device will be discussed in more detail. FIG. 1 is a perspective view of an input system 100 including an input device 104 in communication with a computing device 102 by a touch screen 106. The computing device 102 may be substantially any type of electronic device including a capacitive input mechanism, such as the touch screen 106 or other touch interface. For example, the computing device 102 may be a laptop computer, a tablet computer, a smart phone, a digital music player, portable gaming station, or the like. Although not shown, the computing device 102 may include one or more components of a typical electronic or computing device, such as a processor, to provide control or provide other functions for the device 102. Some illustrative components for operating and communicating with the touch screen 106 are discussed in more detail below with respect to FIG. 4.

The computing device 102 may include the touch screen 106, an enclosure 110, and/or one or more input buttons 108. The enclosure 110 encloses one or more components of the computing device 102, as well as may surround and/or secure a portion of the touch screen 106 to the computing device 102. The one or more input buttons 108 may provide input functions to the computing device 102. For example, the input buttons 108 may adjust a volume for the computing device 102, turn the computing device 102 on or off, or may provide other inputs for the computing device 102. Further, the computing device 100 may also include one or more receiving ports 112. The receiving ports 112 may receive one or more plugs or connectors, such as but not limited to, a universal serial bus (USB) cable, a tip ring sleeve connector, or the like.

The touch screen 106 may include one or more sensors in order to detect one or more input or location signals. Additionally, the touch screen 106 may include a display screen to provide a graphical user interface, and other video and/or image output for the computing device 102. The touch screen 106 and other components of the computing device 102 will be discussed in more detail below.

Figure 2:
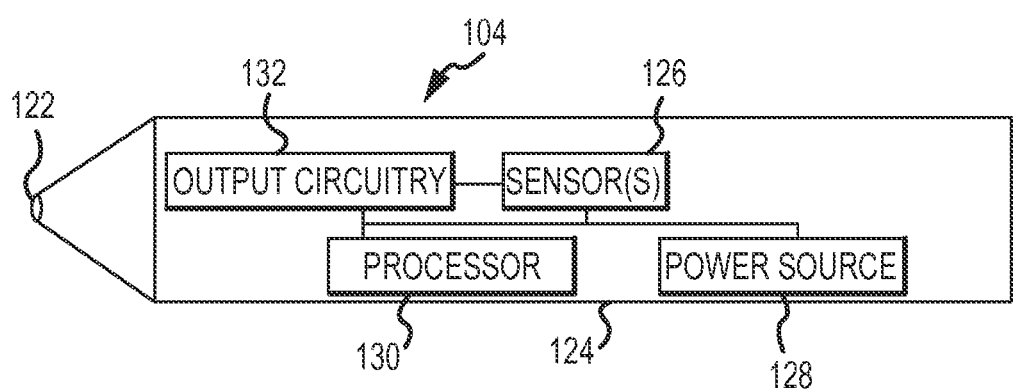
FIG. 2 is an exemplary block diagram of the input device of FIG. 1.

Turning to FIG. 2, the input device 104 will be discussed in more detail. The input device 104 may be configured to be in communication with the computing device 102, specifically through the touch screen 106, discussed in more detail below. FIG. 2 is an exemplary block diagram of the input device 104. With reference to FIGS. 1 and 2, in some embodiments, the input device 104 may be in the form a stylus, and may have a generally elongated main body 124 with a tip 122 at a first end. The tip 122 may be configured to be traced along the touch screen 106. For example, the tip 122 may be a generally resilient material, which may deform upon pressure, and can slide along the surface of the touch screen 106. In another example, the tip 122 may be a relatively hard material and may be configured to roll along the surface of the touch screen.

The tip 122 may be a conductive material, or another material laced with a conductive material, in order to interact with the touch screen 106 and specifically one or more electrode layers (as discussed below) to provide input to the computing device 102. Additionally, the tip 122 may be configured to transmit one more signals, such as voltage signals, to the touch screen 106. For example, the tip 122 may be communicatively coupled to a power source 128, which may provide one or more voltages to the tip 122 to transmit to the touch screen 106. In one embodiment, the tip 122 may act as an electrode that may interact with the touch screen to stimulate an electric field. The tip 122 may be made of metals such as aluminum, brass or steel, as well as conductive rubber, plastic or other materials doped with conductive particles.

It should be noted that the input device 104 may include input components other than the tip that may transfer one or more signals to the touch screen. For example, the input device may include one or more input components positioned on the sides of the body 124 and/or the end of the input device. These components may be used to provide additional data to the touch screen. For example, the input device 104 may include an "eraser" component that may be positioned on the end of the device 104 opposite the tip 122. The eraser may provide a signal that may be differentiated by the touch screen from a signal from the tip. As one example, the eraser signal may be phase or frequency shifted from the tip signal, which may allow the touch screen to identify the signal as being from the eraser.

With continued reference to FIG. 2, the input device 104 may also include one more sensors 126. In some instances the sensors 126 may be configured to detect one more stimuli at the tip 122, the body 124, and/or other areas of the input device 104. For example, the one more sensors 126 may include an accelerometer, a gyroscope, a pressure or force sensor, and so on. In these instances, the sensors 128 may be configured to detect changes in the angle a user may hold the input device 104, a force that the user presses the tip 122 against the touch screen 106, an acceleration of the tip 122 along the touch screen 106, and so on. In some embodiments, the sensor 126 may provide a signal to the processor 130 in response to a sensed parameter, and the processor 130 may use that signal to activate the input device 104. For example, the sensor 126 may be a force sensor that may activate the input device 104 when a user applies a force on the input device 104 (for example, by squeezing the body 124, pressing the tip 122 to the touch surface, or the like). It should be noted that the power source 128 may further provide power to the one or more sensors 128, as necessary or desired.

The input device 104 may also include one or more processing components to control select functions of the input device 104. For example, the input device may include a processor 130 that may control certain functions of the sensors 128. In some embodiments, the processor 130 may determine one or more input signals that may be transmitted through the tip 122 to the touch screen 106 and/or computing device 102. Moreover, as discussed in more detail with respect to FIGS. 8, 9A, and 9B, depending on the desired format of the data transfer between the input device and the touch screen, the input device may include other components, such as amplifiers, signal boosters, modulators, or the like.

Optionally, the input device 104 may also include an output circuitry or interface 132. The output interface 132 may receive and/or transmit one or more signals to and from the input device 104. For example, the output interface 132 may receive one or more radio signals (e.g., Bluetooth), or may be configured to receive one or more electrical (digital and/or analog) signals transmitted from the computing device 102. In the latter example, the output interface 132 may be used in conjunction with or instead of the tip 122 to transmit and/or receive signals from the touch screen 106. For example, the output interface 132 may be configured to receive one or more voltage signals from the touch screen 106 (e.g., through the drive lines). Additionally, the output interface 132 may include a voltage source in order transmit (optionally via the tip 122) one or more signals to the touch screen 106 and/or computing device 102.

Figure 3:
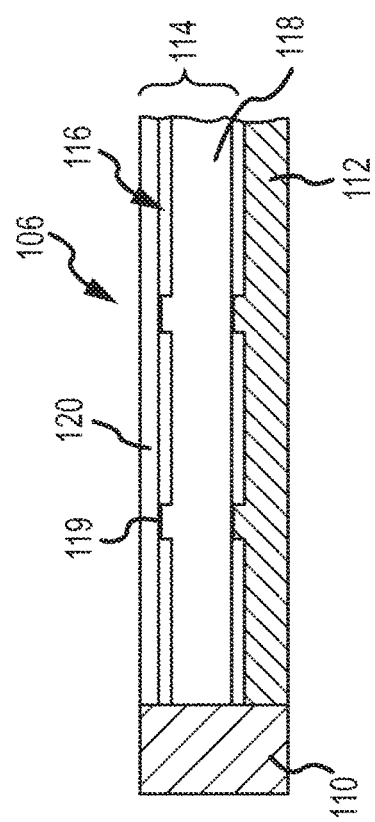
FIG. 3 is a simplified cross-section view of a portion of a touch screen of the computing device taken along line 3-3 in FIG. 1.

The touch screen 106 will now be discussed in more detail. FIG. 3 is a cross-section view of the touch screen 106 taken along line 3-3 in FIG. 1. The touch screen 106 is configured to receive inputs from an object and send this information to a processor. Such information may be, for example, location information based on a user's finger or data from the input device. The touch screen 106 may report touches to the processor 148 and the processor 148 may interpret the touches in accordance with its programming. For example, the processor may initiate a task in accordance with a particular touch. The touch screen 106 may include a display screen 112 and a sensor panel 114 positioned at least partially over the display screen 112. The display screen 112 is configured to display one or more output images and/or videos for the computing device 102. The display screen 112 may be substantially any type of display mechanism, such as a liquid crystal display (LCD), plasma display, or the like. In instances where the display screen 112 is a LCD display, the display screen 112 may include (not shown) various layers such a fluorescent panel, one or more polarizing filters, a layer of liquid crystal cells, a color filter, or the like. It should be noted that FIG. 3 is not drawn to scale and is a schematic view of the touch screen. For example, in some embodiments, there may be an air gap between the display 112 and the sensor glass 118, although this gap is not illustrated in FIG. 3.

The sensor panel 114 may include an electrode layer 116 operably connected to a sensor glass 118 or other type of support structure. The electrodes 116 may be connected to one or both sides of the sensor glass 118. As one example, the electrodes 116 may be positioned on a first side of the sensor glass 118, and the other side of the glass may be coated to form a ground shield. As another example, the sensor glass 118 may be formed of multiple layers of polyethylene terephthalate (PET), with each layer including electrodes 116 operably connected to one side of the layer, and then each of the layers may be stacked to form rows, columns, and/or shield layers.

With continued reference to FIG. 3, the sensor glass 118 may form a portion of the display screen 112 or may be separate therefrom. The sensor glass 118 may be a relatively clear element that may protect the display screen 112 from forces that may be exerted on the sensor panel 114 by a user or input device. In some embodiments, the sensor glass 118 may be a clear glass panel that may allow the display screen 112 to be viewable therethrough. The electrode layer 116 may include one or more electrodes which may be deposited on the sensor glass 118. For example, the electrode layer 116 may include transparent conductive materials and pattern techniques such as ITO and printing. It should be noted that the electrode layer 116 may include a plurality of electrodes separated by gaps, where the electrodes are interconnected by one or more traces or other electrical elements.

In some embodiments, the sensor glass 118 may act as a ground shield to electronically isolate the electrode layer 116 from the display screen 112 and/or other internal components of the computing device 102 (such a processor, or electronic circuits). The electrode layer 116 may include one or two layers of electrodes which may be spaced apart across the layer 116. The electrodes, discussed in more detail with respect to FIG. 4, may define one or more nodes 144 that act as capacitive coupling sensors to detect touches on the touch screen 106. The number and configuration of the nodes 144 may be varied, depending on the desired sensitivity of the touch screen 106.

The touch screen 106 may also include a cover sheet 120 disposed over the electrode layer 116. Thus, the electrode layer 116 may be substantially sandwiched between the cover sheet 120 and the sensor glass 118. The cover sheet 120 protects the other layers of the touch screen 106, while also acting to insulate the electrode layer 116 from external elements (such as fingers or input devices that may contact the cover sheet 120). The cover sheet 120 may generally be formed from substantially any suitable clear material, such as glass or plastic. Additionally, typically the cover sheet 120 should be sufficiently thin to allow for sufficient electrode coupling between the electrode layer 118 and any external input objects (e.g., fingers, input devices). For example, the cover sheet 120 may have a thickness ranging between 0.3 to 2 mm.

It should be noted that in some embodiments, the touch screen 106 may be substantially any type of touch interface. For example, the touch interface may not be see-through and/or may not correspond to a display screen. In these instances, a particular surface or group of surfaces may be configured to receive touch inputs, that may or may not correspond to a separately displayed user interface, icons, or the like.

Figure 4:
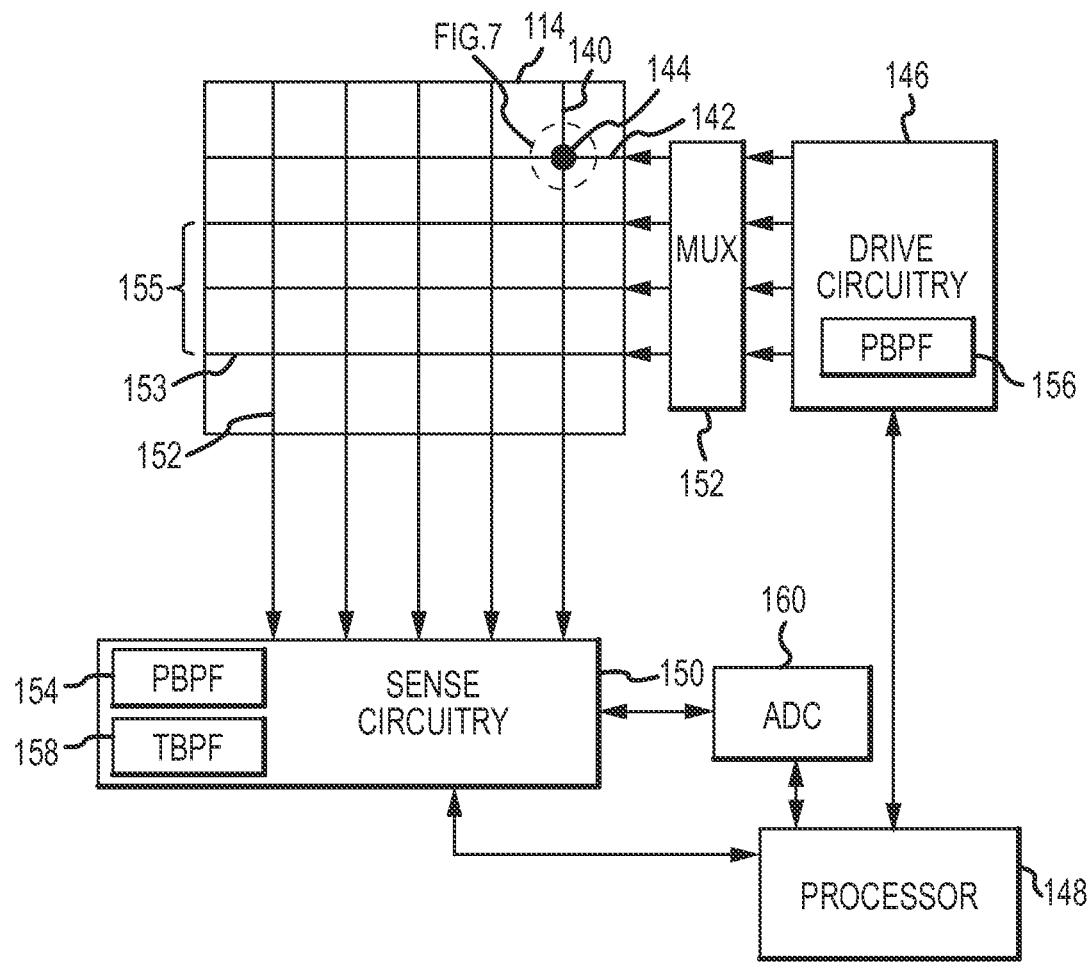
FIG. 4 is a simplified block diagram of a sample touch screen or touch interface and associated circuitry.

Operation of the touch screen 106 during a touch scan will now be discussed in more detail. It should be noted that in the embodiments discussed herein, the touch screen may simultaneously search for user input touches as well as inputs from the input device. Thus, the term "touch scan" may encompass an input device scan as well, as those signals may also be detected during the touch scan. FIG. 4 is an illustrative block diagram of the computing device 102 and touch screen 106. The sensor panel 114 of the touch screen 106 may be configured to detect touches on the surface of the touch screen 106 by changes in capacitance. Typically when two electrically conductive members come close to one another, without actually touching, their electric fields interact to form a capacitance. With reference to FIG. 4, a sensing node 144 formed by one or more electrodes (explained below) may form a first electrically conductive member and an object, such as a finger of the user, may form a second electrically conductive member. The sensor panel 114 of the touch screen 106 may be configured as in a self capacitance arrangement or in a mutual capacitance arrangement.

In the self capacitance arrangement, the electrode layer 116 may include a single layer of a plurality of electrodes spaced in a grid or other arrangement where each electrode may form a node 144. The sensing circuit 150 monitors changes in capacitance that may occur at each node 144. These changes occur at a node 144 when a user places an object (e.g., finger or tip 122 of the input device 104) in close proximity to the electrode.

With continued reference to FIG. 4, in a mutual capacitance system, the electrode layer 116 may include electrodes separated into two layers forming drive lines 142 and sense lines 140. The drive lines 142 may be formed on a first layer of the electrode layer 116 and the sense lines 140 may be formed on a second layer of the electrode layer 116. The nodes 144 for the sensor panel 114 may be defined at locations of the electrode layer 116 where the drive lines 142 may cross over or under the sense lines 140 (although they are typically in different layers). The sense lines 140 may intersect the drive lines 142 in a variety of manners. For example, in one embodiment, the sense lines 140 are perpendicular to the drive lines 142, thus forming nodes 144 with x and y coordinates. However, other coordinate systems can also be used, and the coordinates of the nodes 144 may be differently defined.

A drive controller 146 or other circuitry is connected to each of the drive lines 142. The drive controller 146 provides a stimulation signal (e.g., voltage) to the drive lines 142. The sensing circuit 150 is connected to each of the sense lines 140 and the sensing circuit 150 acts to detect changes in capacitance at the nodes 144. During operation, the stimulation signal is applied to the drive lines 142 and due to the capacitive coupling between the drive lines 142 and sensing rows 140, a current is carried through to the sense lines 140 at each of the nodes 144. The sensing circuit 150 then monitors changes in capacitance at each of the nodes 144. As with the self-capacitance, a change in capacitance at each of the nodes 144 typically occurs when a user places an object such as a finger in close proximity to the node 144 as the object typically steals a charge, affecting the capacitance of the node 144.

In a specific embodiment, each drive line 140 may be driven separately, such that the drive controller 146 may selectively apply the stimulation signal to each row 153 or banks (groups) or rows of drive lines 142. Each drive line 140 may be driven sequentially until the entire set of drive lines 142 has been driven. In some embodiments, the drive lines 142 may be driven in banks 155 or groups. For example, a certain number of rows 153 may form a bank 155, and each row 153 in the bank 155 may be driven together. Although the drive lines 142 are driven individually (or in groups) the sensing circuit 150 may sense changes of capacitance along all of the sense lines 140 in parallel. In other words, each column 152 of sense lines 140 may be sensed substantially simultaneously. It should also be noted that, in some instances, a stimulation signal may be applied to the electrode layer 116 by the input device 104, rather than, or in addition to the drive controller 146. This will be discussed in more detail below, but briefly, the input device 104 may create a capacitive coupling within the electrode layer 116 and apply a voltage signal in order to induce a current through the sense lines 140 and the drive lines 142.

In either the self-capacitance or mutual capacitance arrangements discussed above, the sensing circuit 150 can detect changes in capacitance at each node 144. This may allow the sensing circuit 150 to determine when and where a user has touched various surfaces of the touch screen 106 with one or more objects. The sensing circuit 150 may include one more sensors for each of the sense lines 140 and may then communicate data to a processor 148. In one example, the sensing circuit 150 may convert the analog capacitive signals to digital data and then transmit the digital data to the processor 148. In other examples, the sensing circuit 150 may transmit the analog capacitance signals to the processor 148, which may then convert the data to a digital form. Further, it should be noted that the sensing circuit 150 may include individual sensors for each sensing line 142 or a single sensor for all of the sense lines 140. The sensing circuit 150 may report a location of the node 144, as well as the intensity of the capacitance (or changed thereof) at the node 144.

In some embodiments, the touch screen 106 may include one or more multiplexers. For example, the sensing circuit 150 may include a multiplexer configured to perform time multiplexing for the sense lines 140. For example, during a touch scan the sensing circuit 150 may receive signals from each of the nodes 144 along the sense lines 140 at approximately the same time, and the multiplexer stores the incoming signals and then may release the signals sequentially to the processor 148 one at a time.

In addition to the multiplexers that may be used to process touch signals, the touch screen 106 may also include a drive multiplexer 152. The drive multiplexer 152 may be in communication with the drive lines 142 to switch between a touch mode and a stylus or input device mode. As will be discussed in more detail below, if a signal from the input device is detected, the touch screen 106 may scan the drive lines 142 in order to receive data transmitted from the tip 122 of the input device 104. In these embodiments, the drive controller 146 may further be configured to sense for signals on the drive lines 142 in order to detect a signal transmitted from the tip 122 of the input device. In some embodiments, the drive controller 146 may include components that may be substantially similar to the sense circuitry 150, which may allow the drive controller 146 and the drive lines 142 to act as sense lines 140 and interact with the tip 122 of the input device 104 to receive one or more signals (e.g., voltage signals). In other words, rather than providing a stimulation signal to the drive lines 142, when receiving an input signal from the input device 104, the input signal may act as a stimulation signal to the drive lines 142 (in the form of a data transmission signal). For example, during a stylus mode the drive controller 146 and the sense circuitry 150 may both act as receivers to receive signals from the drive lines 142 and the sense lines 140, respectively, whereas during typical touch mode the drive controller 146 may not generally receive any signals but may provide the stimulation signal to the drive lines 142.

With continued reference to FIG. 4, the sense circuitry 150 may also include two or more signal filters. For example, the sense circuitry 150 and the drive controller 146 may each include a peripheral filter 154, 156. The peripheral filters 154, 156 process signals sensed by the sense lines 140 and the drive lines 142 to isolate a signal from the input device 104, if present. For example, the peripheral filters 154, 156 may be pass band filters that may have a pass band set to allow the input signal of the input device 104, while at the same time rejecting at least a portion of signals generated due to touch events and/or environmental noise. Additionally, as will be discussed in more detail below, in some instances, the input signal may be encoded with digital data by including one or more modulations, such as frequency, phase, or amplitude modulation. In these examples, the pass band of the peripheral filters 154, 156, may have a sufficiently wide bandwidth to allow for the modulations. In many instances the bandwidth may depend on the type of modulation used to encode digital data within the input signal. However, as a general range, the bandwidth required for some modulations may range between 200-600 KHz.

As will be explained in more detail below, the input device 104 may transmit an input signal at a frequency that may be distinct from an operating frequency of the drive controller 146. In other words, the input signal may have a different frequency than the stimulation signal applied by the drive controller 146, so that signals sensed by the sense lines 140 may be different for user input touch events as compared to input device touch events. However, it should be noted that in some embodiments, the input device 104 may have a frequency that may be the same as the operating frequency of the touch screen, but in these cases the input device 104 and the touch screen may need to negotiate signal transmission timing, or the like, in order to determine which signal is being received by the sense lines 140 at a particular moment.

It should be noted that the peripheral filter 156 may be placed into communication with the drive lines 142 when the drive multiplexer 152 switches into stylus mode. In other words, during a touch scan where the drive controller 146 may apply a stimulation signal to the drive lines 142, the peripheral filter 156 may not be in communication with the drive lines 142; however, during stylus mode, the input device 104 may provide a stimulation signal to the drive lines 142, and in these instances the peripheral filter 156 may be placed into communication with the drive lines 142.

With continued reference to FIG. 4, the touch screen 106 may also include a touch filter 158. The touch filter 158 may be in communication with the sense lines 140 and may be incorporated as part of the sense circuitry 150 or separate therefrom. The touch filter 158 processes signals received at the sense lines 140 to determine if a received signal falls within a range to be considered a user touch event. For example, the touch filter 158 may be a band pass filter that may have a pass band configured to receive signals within typical touch frequencies and reject frequencies from the input device 104 and/or environmental noise. The touch filter 158 may have a bandwidth with center frequency ranges between 100-1000 kHz.

It should be noted that although a touch filter 158 is not illustrated in FIG. 4 as being incorporated in to the drive controller 146, in some embodiments, the drive lines 142 may be in communication with a touch filter 158. For example, some components of the drive controller 146 may be substantially the same as the sense circuitry 150 and the drive controller 146 may include a peripheral filter and a touch filter.

The touch screen 106 may further include one or more analog to digital converters (ADCs). For example, the sense circuitry 150 may be in communication with an ADC 160, such that the sense circuitry 150 may provide signals from the sense lines 140 to the ADC 160 which may convert analog signals received from the sense lines 140 into digital signals and provide those digital signal to the processor 148. In one example, the touch screen 106 may include a single ADC 160 for converting signals from the sense lines 140. In this example, the outputs from the peripheral filter 154 and the touch filter 158 for each sense line 140 may be time multiplexed and then provided to the ADC 160. In a second example, the touch screen 106 may include a first ADC for the peripheral filter 154 for each sense line 140 and a second ADC for the touch filter 158 for each sense line 140. In this example, the separate ADCs may convert signals from each of the filters respectively.

Figure 5:
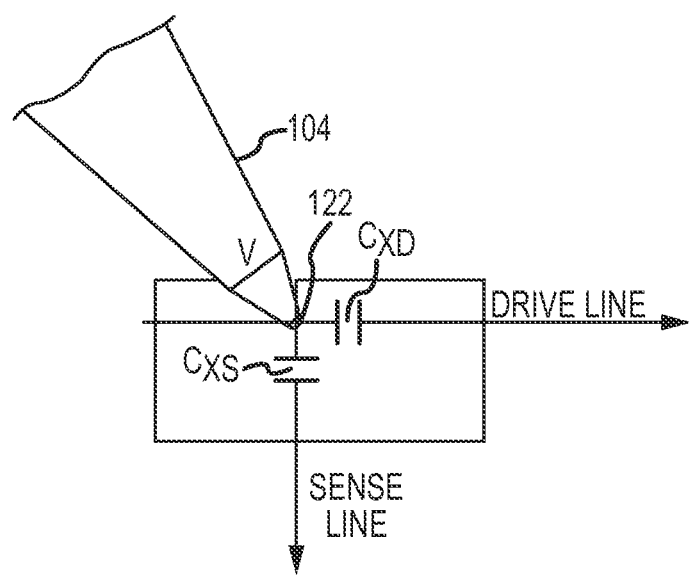
FIG. 5 is an enlarged view of a node of the touch screen in communication with the input device.

Operation of the system 100 and the input device 104 interacting with the touch screen 106 will now be discussed in more detail. FIG. 5 is an enlarged view of the tip 122 of the input device 104 providing an input signal to a node 144 of the touch screen 106. With reference to FIGS. 2 and 5, the input device 104 may provide a voltage signal at the tip 122, and that signal may be applied to the sense lines 140 and/or drive lines 142. The voltage signal may be a waveform, such as, but not limited to, sinusoidal, square, trapezoidal, or triangular wave (see, e.g., FIGS. 9A and 9B). Additionally, it should be noted that the voltage signal may be an analog signal and/or may include digital data encoded therein. For example, the voltage signal may include data encoded in the amplitude, phase, frequency, and/or shape. In some embodiments, the voltage signal may be a relatively narrowband frequency modulated and/or phase modulated signal. For example, the voltage signal may have a frequency shift of approximately 20 kHz and/or a phase shift of approximately 180 degrees that may include data encoded within each of the shifts. Illustrative embodiments for data transfer from the voltage signal in the tip 122 will be discussed in more detail below. However, with reference to FIG. 5, there may be a tip to drive line capacitance Cxd, a tip to sense line capacitance Cxs. The changes in the Cxd, Cxs, as well as the applied voltage signal may transfer data from the input device 104 through the drive and sense lines to the touch screen 106.

The voltage signal from the input device 104 may be configured to be transferred at a frequency range that may be different from the frequency of the stimulation signal. In this manner, the peripheral filters 154, 156 may be able to separate the voltage signal from the input device from the stimulation signal, and thus distinguish between user touches and input device touches. That is, the peripheral filters 154, 156 may attenuate and/or reject any signal outside of the pass band range, such as touch inputs, while passing through signals within the pass band range, such as signals from the input device.

Figure 6:
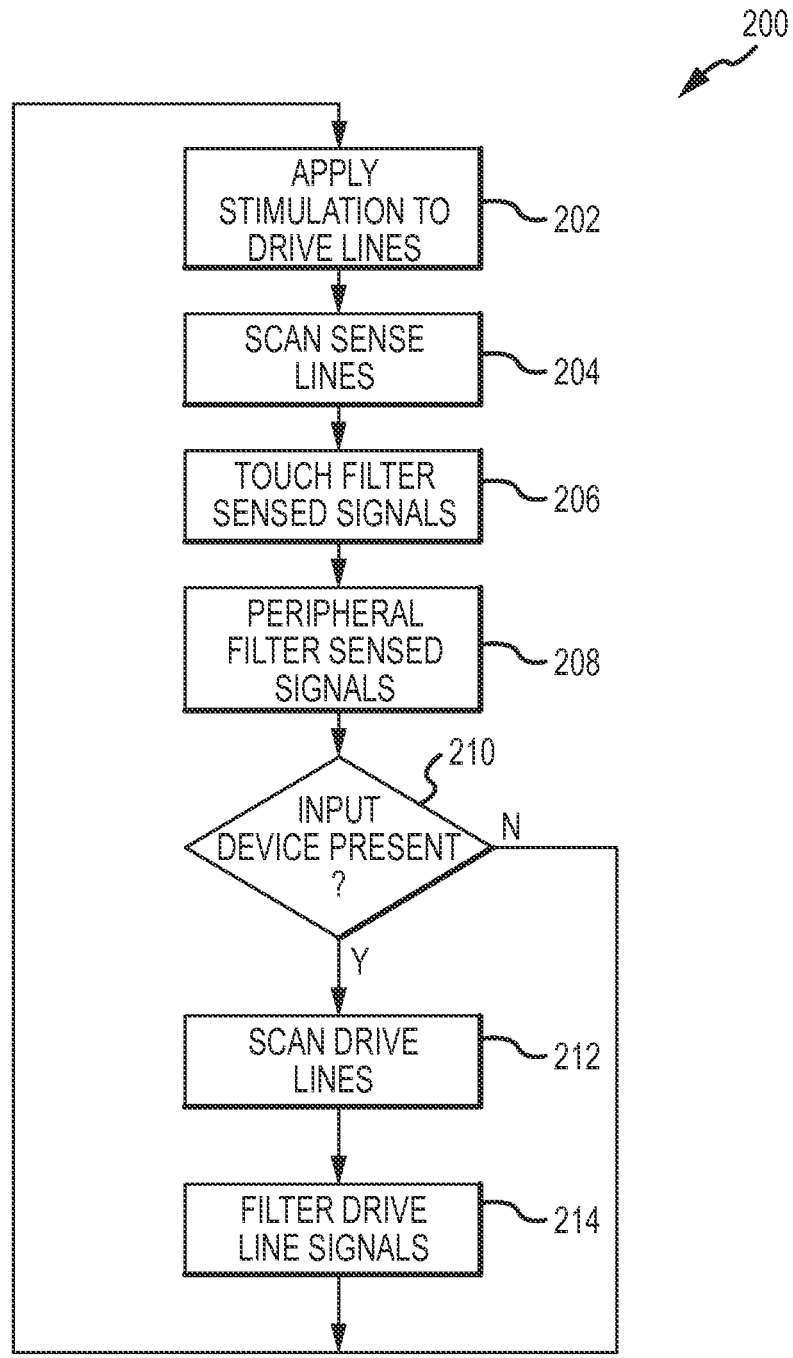
FIG. 6 is a flow chart illustrating a method for using a touch screen to receive data from an input device.

A method for using the touch screen to receive data from the input device will now be discussed in more detail. FIG. 6 is a flow chart illustrating a method 200 for using the input device 104 to transmit information to the touch screen 106. The method 200 may begin with operation 202 and the drive controller 146 may apply a stimulation signal to the drive lines 142. The drive controller 146 may apply the stimulation signal to a single drive line 142, a group of drive lines 142 (for example, a bank of drive lines), or may apply the stimulation signal to the entire set of drive lines 146. In many embodiments the drive controller 146 may apply the stimulation signal to groups of drive lines 142, and may stimulate the groups sequentially until all of the drive lines 142 have been stimulated. As briefly mentioned above, the stimulation signal may be selected to have a frequency that may be different from a frequency of the input signal from the input device 104.

Once the stimulation signal has been applied to the drive lines 142, the method 200 may proceed to operation 204. In operation 204 the sense circuitry 150 may scan the sense lines 140. As discussed above, when the stimulation signal is applied to the drive lines 142, a current may be induced in the sense lines 140 and changes in capacitance may be detected by the sense circuitry 150. Additionally, the input device 104 may also provide a stimulation signal to the sense lines 140. That is, the input signal from the input device 104 may be a sufficient voltage to stimulate the sense lines 140. Accordingly, during operation 204, the sense circuitry 150 may receive signals from each of the sense lines 142.

Once the signals from the sense lines 142 have been received, the method 200 may proceed to operation 206. In operation 206 the touch filter 158 may process the signals from each channel or sense line 140. As described above, the touch filter 158 may be a band pass filter with a bandwidth set to allow touch signals to be passed through, but to reject signals from the input device and/or environmental noise. Accordingly, in some embodiments, the touch filter 158 may output only signals that may be generated by a user providing one or more touches to the touch screen 106.

Substantially simultaneously with operation 206, the method 200 may also proceed to operation 208 and the peripheral filter 154 in the sense circuitry 150 may filter the sensed signals from the sense lines 140. In other words, the sense circuitry 150 may provide the sensed signals from the sense lines 140 to the touch filter 158 and the peripheral filter 154 substantially simultaneously so that the two filters can filter the signals at the same time. However, it should be noted that in other embodiments, the touch filter and the peripheral filtering may be done at different times, e.g., in a multiplexed manner. Moreover, in some instances, the peripheral filter 154 and the touch filter 158 may receive the signals prior to those signals being filter by an analog filter such as the ADC 160, or the peripheral filter 154 and the touch filter 158 may filter the received signals after the signals have been filtered by the ADC 160, or another signal filtering combination (e.g., the peripheral filter 154 may receive signals from the ADC, whereas the touch filter provide signals to the ADC).

During operation 208, the peripheral filter 154 may process the sensed signals to determine if the signals are from the input device or due to a user touch. For example, opposite of the touch filter, the peripheral filter is configured to reject signals having a frequency corresponding to a user touch, and allow only those signals having a frequency generally corresponding to the input device 104 signal. However, as briefly discussed above, because the signal from the input device may be encoded with digital data (for example, through frequency or phase modulation), the peripheral filter 154 may further be configured to have a bandwidth allowing the modulations in the input signal to still be output. In other words, the pass band bandwidth of the peripheral filter 154 may be sufficiently wide to allow for modulations in frequency and/or phase from the input signal, so that although certain parameters of the input signal may vary, the input signal may not be filtered out or rejected.

After operations 206, 208 and the signals sensed by the sense lines 140 have been filtered by both the touch filter 158 and the peripheral filter 154, the method 200 may proceed to operation 210. In operation 210, the processor 148 may analyze the output from the touch filter and the peripheral filter to determine if the input device 104 is present. For example, if the output from the peripheral filter 154 is relatively small or otherwise is not present, the processor 148 may determine that the input device is not providing a signal to the touch screen. On the contrary, if the output from the peripheral filter 154 has a value other than zero, the processor 148 may determine that the input device 104 is providing the input signal to the touch screen.

If the input device 104 is present, the method 200 may proceed to operation 212. In operation 212 the touch screen 106 may scan the drive lines 142. As one example, the multiplexer 152 may disconnect the drive lines 142 from a voltage source of the stimulation signal, and may connect the drive lines 142 to one or more sensors. In some embodiments, the drive lines 142 may be scanned similarly to the sense lines 140, that is, each of the drive lines may be analyzed to detect changes in a signal or capacitance.

Once the drive lines 142 have been scanned, the method 200 may proceed to operation 214. In operation 214, the signals from the drive lines 142 may be provided to the peripheral filter 156 in communication with the drive controller 146. The peripheral filter 156 may filter the received signals to remove any user touch and/or environmental frequencies. It should be noted that by scanning the drive lines 142 to receive the input signal from the input device 104, the touch screen 106 may receive position information along the drive lines as well as the sense lines. That is, while the input device 104 is transmitting a signal, when the sense lines are scanned, the touch screen 106 may determine the location of the input device 104 along a first axis, and when the drive lines are scanned, the touch screen may determine the location of the input device 104 along a second axis. Thus, the node 144 location of the input device 104 may be determined by scanning both the drive lines and the sense lines. This may be required, because unlike a touch scan and the application of the stimulation signal, the location of the input signal applied by the input device 104 with respect to the drive lines may not be known.

The filtered input device signal as provided by the peripheral filters 154, 156 may include data from the input device 104. As descried above, the input device 104 may include one or more sensors 126 that may provide data at the touch screen 106. Additionally, the input device 104 may also transfer data regarding the power level in the power source, and as mentioned above, the input signal may be used by the touch screen to determine the position of the input device. As such, the touch screen may receive a variety of data from the input device 104 which may be used to vary an output on the display 118, be provided as inputs to one or more applications on the touch screen 106, or the like. After operation 214, or if the input device 104 is not present in operation 210, the method 200 may return to touch mode and return to operation 202.

Multiple Input Devices

Figure 7:
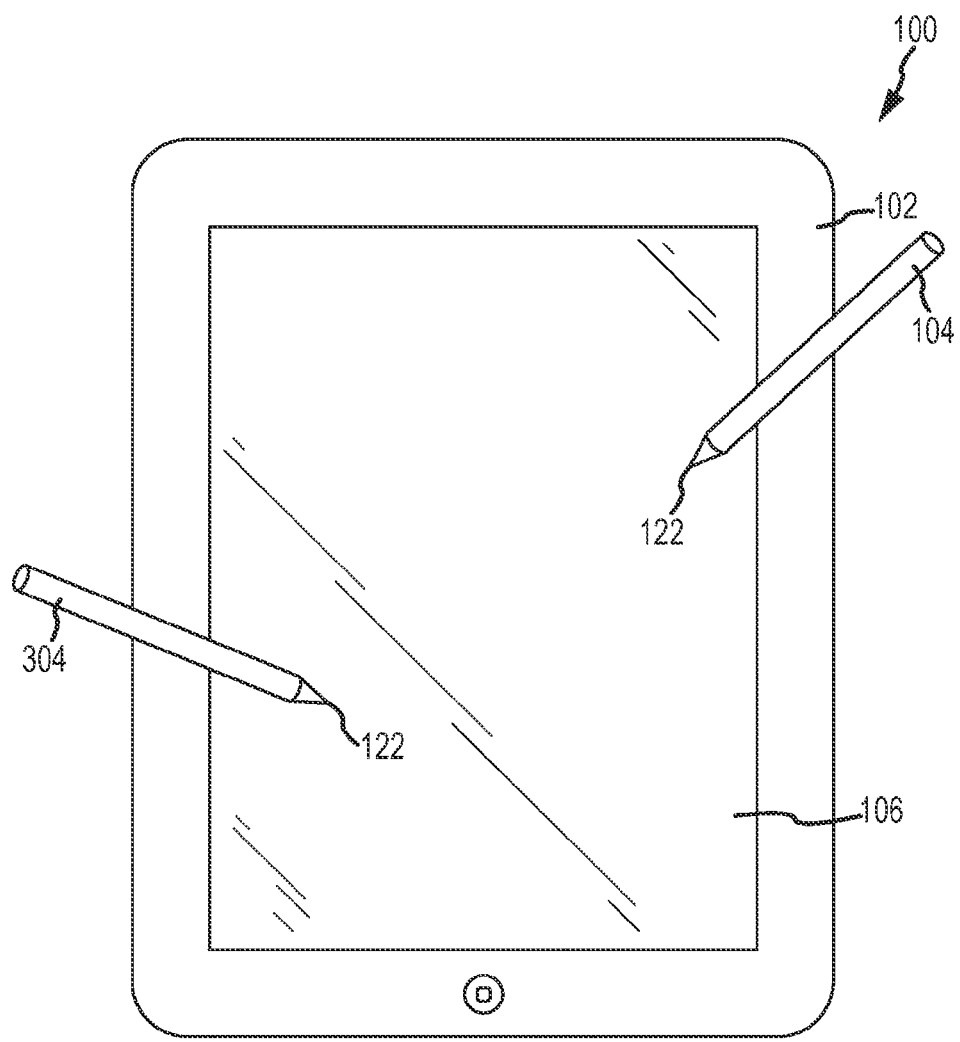
FIG. 7 is a perspective view of a system including a computing device and two input devices configured to provide input data to the computing device.
Figure 8:
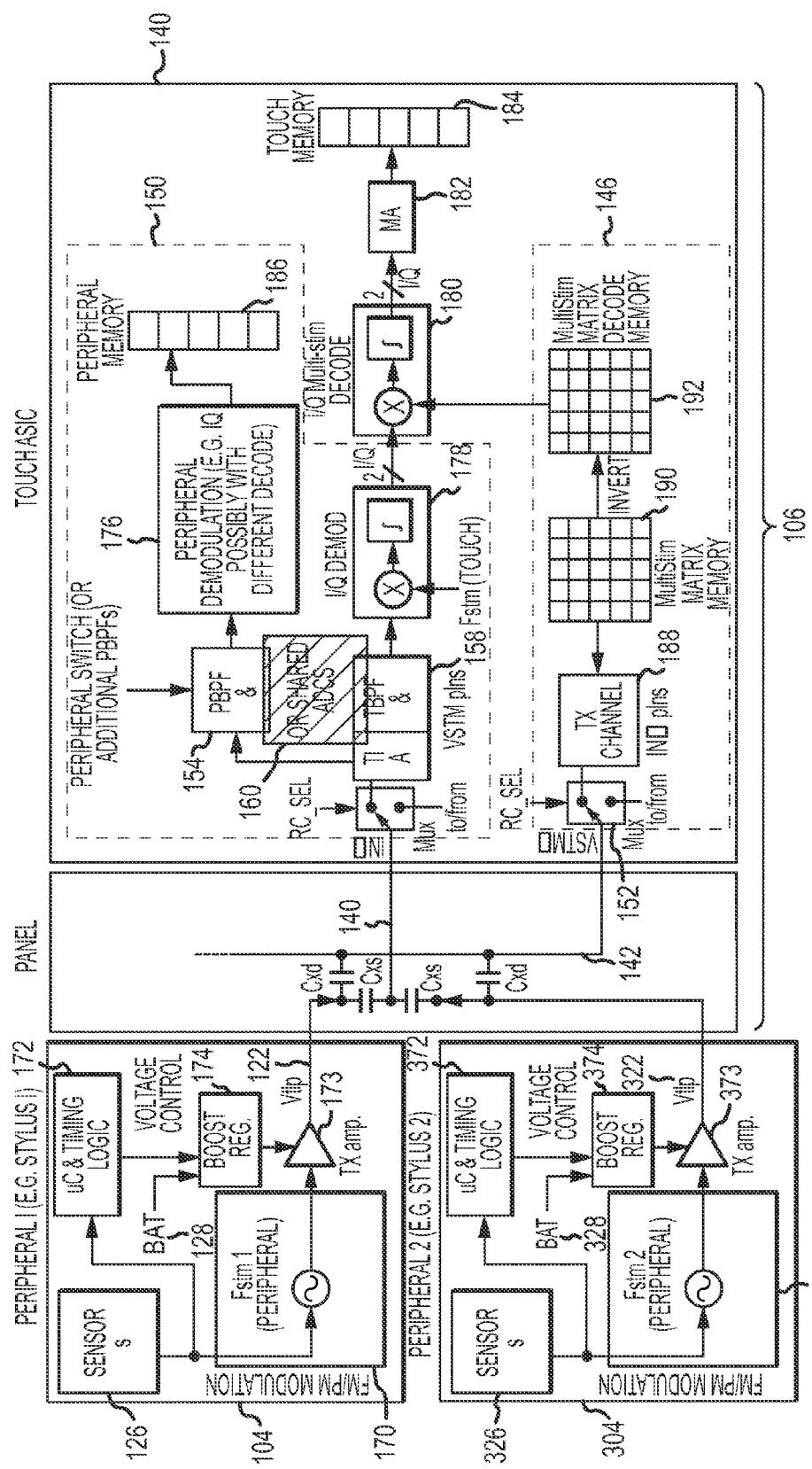
FIG. 8 is a schematic of an illustrative implementation of the input devices, the touch screen, and associated circuitry of FIG. 7.

In some embodiments, the touch screen 106 may be configured to receive data from two or more peripheral or input devices. FIG. 7 is a top perspective view of the two input devices communicating with the touch screen 106. FIG. 8 is a schematic of an illustrative embodiment of the two input devices communicating with the touch screen illustrated in FIG. 7. In these embodiments, the first input device 104 may be used by a first user to provide input the computing device 102, and the second input device 304 may be used substantially simultaneously with the first input device 104 by a second user or the same user. In this manner, two separate users may provide input to the computing device 102 through their own input devices 104, 304, or a user may use two or more input devices 104, 304 to provide input to the computing device 102. For example, using a drawing application or program, the first input device 104 may represent a first color that may be displayed on the screen or a first width brush and the second input device 304 may represent a second color and/or a second width brush. Alternatively, each of the input devices 104, 304 may be selectively modified by changing an input to the one or more sensors 126 (e.g., by a user varying the applied force, tilt, or the like of the respective device).

The second input device 304 may be substantially similar to the first input device 104. For example, the second input device 304 may include one or more sensors 326, a power source 328, a tip 322, and the like. Additionally, with reference to FIG. 8, both the input devices 104, 304 may include a signal generator 170, 370, a timing logic component 172, 372, a boost regulator component 174, 374, and/or a transmission amplifier 173, 373. These components may be varied in other implementations, but in the implementation illustrated in FIG. 8, these components may create the input signal for the respective input device 104, 304 and encode the signal (via modulation) to include data, and prepare the signal to be transferred to the touch screen. For example, in some instances, the transmission amplifier 173, 373 may be used to amplify the signal prior to transmission in order to assist the touch screen in receiving the input signal.

In instances where two or more input devices may be used to provide communication to the touch screen 106, each input device 104, 304 may be configured to communicate with a different frequency from each other. In other words, an input signal transmitted from a tip 122, 322 of each input device 104, 304 may have different frequencies from each other and may have different frequencies from the stimulation signal of the touch screen 106. In one embodiment, the touch screen may alternatively filter the signals from the sense lines 140 to detect the first input device and the second input device. For example, touch screen 106 may apply the stimulation signal to a first set of drive lines 142 and scan the sense lines 140 for any user touch inputs and/or for any inputs from the first input device 104. Then, the touch screen 106 may apply the stimulation signal to a second set of drive lines 142 and scan the sense lines 140 and any user touch inputs and/or any inputs from the second input device 304. In this method, the touch screen 106 may include two separate peripheral filters 154 for each input device, or may otherwise vary the pass band of the peripheral filter 154 based on the input device. This may be required, because as described above, the two input devices 104, 304 may have different operating frequencies, and therefore the pass band for the peripheral filters may need to be modified to be configured to accept frequencies within the range of a respective input device.

In some embodiments, each input device 104, 304 may include one or more defined frequencies. As a first example, the touch screen 106 may implement a pair procedure, which may allocate specific frequencies to select input device. For example, both input devices 104, 304 may be connected through a wire or other mechanism to the computing device, and the touch screen 106 or computing device may allocate a specific frequency or range of frequencies to each input device. After this initial pairing, each respective input device may use the selected frequency to transfer the input signals. As a second example, the input devices may be dynamically reprogrammable by a user, through a backdoor wireless communication channel to the computing device, or other mechanism. For example, the input device may be reprogrammed as soon as two or more input devices operating at the same or similar frequencies are detected.

With reference to FIG. 8, operation of an illustrative embodiment will now be discussed in further detail. Each input device 104, 304 may generate an input signal through a signal generator 170, 370, the input signal from each device 104, 304 may be transmitted to the touch screen 106 through the respective tips 122, 322 of the devices 104, 304. As the tip 122, 322 contacts the touch screen 106, the voltage of the input signal may induce a current in the sense lines 140, which may be detected by the sense circuitry 150. In some embodiments, the touch screen 106 may interleave searching for each of the two input devices 104, 304. For example, the first input device 104 may transmit at a first frequency and the second input device 304 may transmit at a second frequency, and between a touch scan where the touch screen may drive one or more of the drive lines 142, the sense lines may be multiplexed to a first peripheral filter that may be configured to receive the first frequency. Then, after the next drive lines are scanned, the sense circuitry 150 may connect the sense lines 140 to a second peripheral filter. Alternatively, the output from the sense lines 140 may be transmitted substantially simultaneously to the first and second peripheral filters.

Once an input signal from one of the input devices 104, 304 is received, the signal may be transmitted to a peripheral demodulation component 176. The demodulation component 176 may demodulate the signal to extract digital data transmitted through an analog voltage signal of the input devices 104, 304. The digital data may then be transferred to a memory component 186 until the processor 148 or other element may need to use the data. The touch screen 106 may also then scan the drive lines 142 for the input device signal and provide any received data to the processor 148.

Similarly, when a touch input is received, the touch filter 160 may transmit the filtered signal to a touch demodulation component 178, a decoder 180, and a multiple and accumulate component. After the touch signals are demodulated, they may be combined in the decoder 180 with the data from the drive lines 142. The drive controller 146, which may include a transmission component 188 for providing the stimulation signal to the drive lines 142, may stimulate the drive lines 142 during a touch scan to induce a current in the sense lines 140 in order so that the sense lines 140 may be able to detect changes in capacitance at the nodes 144.

It should be noted that the implementation illustrated in FIG. 8 is meant as a single example only. As one example, in FIG. 8 the ADC 160 is illustrated as a single component shared by the peripheral filter and the touch filter; however, in some instances, each of the filters may have their own ADC. Embodiments of the present disclosure may be implemented in a variety of manners, and the discussion of any particular component or structure is meant as illustrative and not limiting.

Examples of data transmission from the input device 104 to the touch screen 106 will now be discussed. The input device 104 may transmit data corresponding the one or more sensors 126, as well as other characteristics of the input device 104. For example, the input device 104 may transmit a power level remaining (e.g., battery level), tilt or angle relative to the touch screen 106, input or user force on the input device, as well as other parameters. The type of data transferred may depend on the configuration of the input device, as well as a desired application or software executed by the touch screen.

Figure 9A:
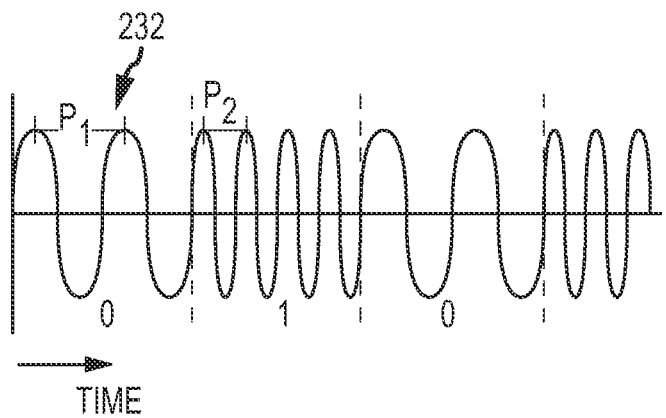
FIG. 9A is a diagram of a sample sinusoidal waveform encoded by frequency modulation.

The data signal or transmission signal from the input device 104 may be analog, digital, or a combination signal including both analog and digital characteristics. As briefly discussed above the input device 104 may transmit data in the form of a voltage signal to the touch screen 106. The voltage signal may be encoded with one or more changes in frequency that may each represent data. FIG. 9A is a diagram of a sample sinusoidal waveform encoded by frequency modulation. However, it should be noted that other types of waveforms may be used as the carrier wave from the data. With reference to FIG. 9A, digital data, such as readings from one or more sensors 126, may be represented by two different frequencies of the carrier wave. For example, a first portion of the sine wave 232 may have a period P1 and a second portion may have a period P2, such that during a first time period, the sine wave 232 may have a first frequency of 1/P1 and during a second time period the sine wave 232 may have a second frequency of 1/P2. In this instance, the first frequency may represent a digital 0 and the second frequency may represent a digital 1.

Figure 9B:
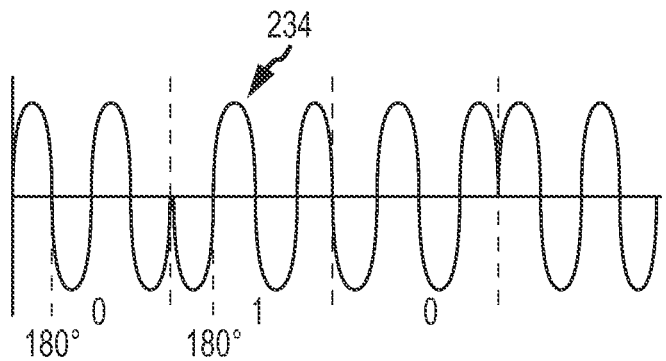
FIG. 9B is a diagram of a sample sinusoidal waveform encoded with data by phase shifting.

As another implementation, the input device 104 may encode digital data as phase changes in the signal transmitted from the tip 122 to the touch screen 106. FIG. 9B is a diagram of a sample sinusoidal waveform encoded with data by phase shifting. With reference to FIG. 9B, using phase shifting, the digital data may be represented by different phases or phase shifts of the carrier wave. For example, a sine wave 234 may, during a predetermined time period, have a first portion with a first phase, and a second portion with a second phase that is shifted (e.g., either 90° or 180°) from the first phase. In this manner, the portion of the sine wave 234 having the first phase may represent a digital 0 and the second portion of the sine wave 234 shifted from the first portion may represent a digital 1.

It should be noted that in other embodiments, the data signal from the input device 104 may be otherwise encoded with digital data. For example, the data signal may be encoded through amplitude modulation, angle modulation (varying an angle of the carrier wave), or the like. In these instances, the touch screen and/or the input device may be differently configured, as desired. Further, shift keying, such as amplitude and/or frequency shift keying may further be used to transfer data to and from the input device and the touch screen.

CONCLUSION

The foregoing description has broad application. For example, while examples disclosed herein may focus on input devices, it should be appreciated that the concepts disclosed herein may equally apply to substantially any other type of communication between electronic devices. Similarly, although the input device and receiving unit may be discussed with touch screens, the devices and techniques disclosed herein are equally applicable to other types of capacitive coupling systems. Accordingly, the discussion of any embodiment is meant only to be exemplary and is not intended to suggest that the scope of the disclosure, including the claims, is limited to these examples.

What is claimed is:

1. A computing device configured to receive data from a peripheral device, comprising:
   a processor;
   a touch interface in communication with the processor and configured to detect an input corresponding to an object approaching or contacting a surface, the touch interface comprising a plurality of drive lines coupled via a multiplexer to drive circuitry and a plurality of sense lines coupled to sense circuitry;
   a touch filter in the sense circuitry in communication with at least one of the plurality of sense lines and configured to reject a peripheral frequency corresponding to a peripheral signal of the peripheral device;
   a first peripheral filter in the sense circuitry in communication with the at least one of the plurality of sense lines and configured to reject a touch frequency component corresponding to a touch signal corresponding to a touch input; and
   a second peripheral filter in the drive circuitry in communication with at least one of the plurality of drive lines and configured to detect the peripheral signal of the peripheral device along the drive lines;
   wherein the multiplexer is configurable to:
   couple the drive lines to a stimulation signal in the drive circuitry when scanning the sense lines for the touch and peripheral signals: and
   couple the drive lines to the second peripheral filter in the drive circuitry when scanning the drive lines for the peripheral signal when the peripheral signal is detected by the sense circuitry in response to the stimulation signal.

2. The computing device of claim 1, wherein the touch interface further comprises:
   a display screen in communication with the processor and configured to provide a visual output for the computing device.

3. The computing device of claim 1, wherein the peripheral signal and the touch signal are provided to the first peripheral filter and the touch filter, respectively, by the at least one of the plurality of sense lines.

4. The computing device of claim 1, wherein the touch interface further comprises one or more analog to digital converters, wherein the analog to digital converters are in communication with the touch filter and the first peripheral filter.

5. The computing device of claim 1, wherein the touch filter and the first peripheral filter receive the input from the touch interface substantially simultaneously.

6. The computing device of claim 1, wherein the touch filter is a band pass filter having a pass band set to a frequency corresponding to a frequency of the touch signal.

7. The computing device of claim 6, wherein the pass band of the touch filter ranges between 100 kHz to 10000 kHz.

8. The computing device of claim 1, wherein the first peripheral filter and the second peripheral filter are band pass filters having a pass band set to a frequency corresponding to a frequency of the peripheral signal.

9. The computing device of claim 8, wherein the pass band of the first and second peripheral filters ranges between 100 kHz to 2000 kHz.

10. A method for receiving digital data from a peripheral input device at a touch screen including a plurality of drive lines and a plurality of sense lines, the method comprising:
scanning the plurality of sense lines, wherein the plurality of drive lines are coupled via a multiplexer to a stimulation signal when scanning the plurality of sense lines;
filtering a first signal received through one or more of the plurality of sense lines by a touch filter coupled to the one or more of the plurality of sense lines;
filtering the first signal by a first peripheral filter coupled to the one or more of the plurality of sense lines;
analyzing a touch output from the touch filter and a peripheral output from the first peripheral filter to determine whether the first signal is a touch signal or an input device signal; and
when the first signal is determined to be the input device signal:
coupling, via the multiplexer, a second peripheral filter to one or more of the plurality of drive lines;
scanning the plurality of drive lines; and
filtering a second signal received through the one or more of the plurality of drive lines by the second peripheral filter.

11. The method of claim 10, wherein the input device signal is a modulated analog signal including digital data corresponding to the input device.

12. The method of claim 10, wherein the input device is a stylus.

13. The method of claim 10, wherein the first peripheral filter and the touch filter are band pass filters.

14. The method of claim 13, wherein a pass band of the first peripheral filter is different from a pass band of the touch filter.

15. The method of claim 14, wherein the first peripheral filter is configured to reject a bandwidth of frequencies falling within the pass band of the touch filter.

* * * * *

UNITED STATES PATENT AND TRADEMARK OFFICE
CERTIFICATE OF CORRECTION

PATENT NO. : 9,557,845 B2  
APPLICATION NO. : 13/560958  
DATED : January 31, 2017  
INVENTOR(S) : Shahrooz Shahparnia Page 1 of 1

It is certified that error appears in the above-identified patent and that said Letters Patent is hereby corrected as shown below:

In the Claims

At Column 17, Claim number 10, Line number 4, please delete the word "digital".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*